(12) United States Patent
Lenz

(10) Patent No.: US 10,534,389 B2
(45) Date of Patent: Jan. 14, 2020

(54) DEVICE AND METHOD OF COMPENSATION STABILIZATION USING MILLER EFFECT

(71) Applicant: STMicroelectronics (Alps) SAS, Grenoble (FR)

(72) Inventor: Kuno Lenz, Voreppe (FR)

(73) Assignee: STMicroelectronics (Alps) SAS, Grenoble (FR)

(*) Notice: Subject to any disclaimer, the term of this patent is extended or adjusted under 35 U.S.C. 154(b) by 0 days.

(21) Appl. No.: 16/130,706

(22) Filed: Sep. 13, 2018

(65) Prior Publication Data

US 2019/0094895 A1 Mar. 28, 2019

(30) Foreign Application Priority Data

Sep. 25, 2017 (FR) .................................... 17 58834

(51) Int. Cl.
*G05F 1/575* (2006.01)
*H02M 3/156* (2006.01)
*H02M 3/158* (2006.01)

(52) U.S. Cl.
CPC ............ *G05F 1/575* (2013.01); *H02M 3/156* (2013.01); *H02M 3/158* (2013.01); *Y02B 70/1466* (2013.01)

(58) Field of Classification Search
CPC ....... H02M 3/156–158; H02M 3/1582; H02M 3/1584; H02M 3/1588; G05F 1/56; G05F 1/565; G05F 1/575; Y02B 70/1466
USPC ................. 323/271, 273, 281, 282
See application file for complete search history.

(56) References Cited

U.S. PATENT DOCUMENTS

| | | | |
|---|---|---|---|
| 6,788,146 B2 * | 9/2004 | Forejt ..................... | H03F 1/086 330/257 |
| 7,233,198 B2 * | 6/2007 | Niederkorn ............... | H03F 1/02 330/311 |
| 7,893,670 B2 * | 2/2011 | Pulijala ................... | G05F 1/575 323/273 |
| 9,436,197 B1 * | 9/2016 | Tang ....................... | G05F 1/565 |
| 2003/0111986 A1 * | 6/2003 | Xi ........................... | G05F 1/575 323/280 |
| 2003/0169104 A1 * | 9/2003 | Huckins .................. | H03F 1/086 330/69 |
| 2016/0099645 A1 | 4/2016 | Fujimura et al. | |

FOREIGN PATENT DOCUMENTS

| | | |
|---|---|---|
| CN | 101727119 A | 6/2010 |
| CN | 103135642 A | 6/2013 |
| CN | 106774572 A | 5/2017 |

* cited by examiner

*Primary Examiner* — Yemane Mehari
(74) *Attorney, Agent, or Firm* — Slater Matsil, LLP

(57) ABSTRACT

In some embodiments, a Miller compensation and stabilization device for a feedback control loop includes a capacitor and a control circuit. The capacitor has a first terminal configured to be coupled to an output of a comparator of the feedback control loop and a second terminal. The control circuit is coupled to the second terminal of the capacitor and is configured to control, in response to a voltage applied to a setpoint input of the feedback control loop, a first voltage across the first and second terminals of the capacitor by controlling a value of a potential of the second terminal of the capacitor such that the first voltage is lower than a threshold.

23 Claims, 5 Drawing Sheets

DEVICE AND METHOD OF COMPENSATION STABILIZATION USING MILLER EFFECT

CROSS-REFERENCE TO RELATED APPLICATIONS

This application claims priority to French Patent Application No. 1758834, filed on Sep. 25, 2017, which application is hereby incorporated herein by reference in its entirety.

TECHNICAL FIELD

The present invention relates generally to an electronic system and method, and, in particular embodiments, to a device and method of compensation stabilization using miller effect.

BACKGROUND

The Miller effect refers to the use of a capacitor present on a circuit board to simulate a capacitor having a higher value for a portion of the electronic circuit present on the board.

FIG. 1 shows a device DISP1 for feedback-controlling a voltage comprising a feedback control loop BA1 and a Miller compensation device according to the prior art.

The feedback control loop BM comprises an operational amplifier AO1 and the Miller compensation device comprises a capacitor C1. The device DISP1 supplies power to a load Zch1.

An input voltage Vin1 is applied to a negative input E11 of the amplifier AO1. A positive input E12 of the amplifier AO1 is linked to an output SR1 of a variable gain R1. A first terminal ER11 of the gain R1 is linked to a ground GND and a second terminal ER12 is linked to an output terminal Sout1 of the device DISP1. The load Zch1 is linked in parallel to the variable gain R1 to the ground GND and to the terminal Sout1.

The capacitor C1 is linked both to the terminal Sout1 and to an output SAO1 of the amplifier AO1. The capacitor C1 is known to those skilled in the art as a "Miller capacitance" and is sized such that the device DISP1 is stable within the bandwidth of the amplifier AO1. The gate G1 of a PMOS transistor T1 is linked to the output SAO1, the drain D1 of the transistor T1 is linked to the terminal Sout1 and the source S1 of the transistor T1 is linked to the potential Vcc.

When a DC voltage is applied, the output voltage Vout1 of the device DISP1 at the terminal Sout1 is equal to the value of the variable gain R1 multiplied by the value of the voltage Vin1. The value of the variable gain R1 is chosen such that the value of the voltage Vout1 is equal to a predetermined constant value, for example 5 V.

The potential at the gate G1 is equal to Vcc minus the gate-source voltage $V_{GST1}$ of the transistor T1. The value of the voltage $V_{GST1}$ is for example equal to 0.7 volts.

The device DISP1 controls the output voltage of the amplifier AO1 such that the potential at the output SAO1 is substantially equal to the potential Vcc, the voltage at the output of the amplifier AO1 is equal to Vcc minus the voltage $V_{GST1}$.

The potential Vcc may reach high values, for example a value of 28 volts.

The potential Vcc is for example the positive terminal of a battery for an automobile, the voltage of which varies between 6 and 28 volts.

Consequently, the value of the voltage across the terminals of the capacitor C1 may reach high values, for example up to 22.3 volts, and damage the capacitor C1, which generally withstands a maximum value of 3.64 volts.

FIG. 2 shows the gain curve G1 and the phase curve φ1 according to frequency F for a capacitor C1 of 200 pF of the device DISP1.

A voltage feedback control device DISP2, comprising two operational amplifiers AO2 and AO3 that is suitable for high voltages and supplies power to a load Zch2, is known from the prior art.

The device DISP2 is shown in FIG. 3.

The voltage Vin2 is applied to an input E21 of the amplifier AO2 and an input E31 of the amplifier AO3. The inputs E21 and E31 are linked to the negative terminals of the amplifiers AO2 and AO3, respectively.

Inputs E22 and E32 that are linked to the positive terminals of the amplifiers AO2 and AO3, respectively, are linked to an output SR2 of a variable gain R2. A first terminal ER21 of the gain R2 is linked to a first terminal of a switchable gain R3 and a second terminal ER22 of the gain R2 is linked to an output terminal Sout2 of the device DISP2. A second terminal of the switchable gain R3 is linked to a ground GND. The load Zch2 is linked in parallel to the variable R2 and switchable R3 gains, to the ground GND and to the terminal Sout2.

The gate G2 of a PMOS transistor T2 is linked to an output SAO2 of the amplifier AO2, the drain D2 of the transistor T2 is linked to the terminal Sout2 and the source S2 of the transistor T2 is linked to the potential Vcc.

The gate G3 of a PMOS transistor T3 is linked to an output SAO3 of the amplifier AO3, the drain D3 of the transistor T3 is linked to the terminal Sout2 and the source S3 of the transistor T3 is linked to the potential Vcc.

A current Iout2 flows at the output of the device DISP2 through the terminal Sout2 and creates a voltage Vout2 across the terminals of the load Zch2.

In this example, the amplifiers AO2 and AO3 are sized for two different load current Iout2 value ranges such that at least one amplifier is stable within one of the two load current value ranges. The amplifier AO2 is activated when the current Iout2 is smaller than, for example, 20 mA, and the amplifier AO3 is activated when the current Iout2 is larger than 20 mA in this example. The consumption of the amplifier AO2 is of the order of 15 µA and that of the amplifier AO3 is of the order of 2 mA.

Depending on the value of the current Iout2, the switchable gain is activated and one of the amplifiers is activated, or in other words if the value of the current Iout2 is higher than 20 mA, the gain R3 is activated and the amplifier AO3 is activated. If the value of the current Iout2 is lower than 20 mA, the gain R3 is deactivated and the amplifier AO2 is activated.

This device no longer includes a capacitor.

FIG. 4 shows the output voltage Vout2 of the device Iout2 according to the current Iout2 at the output terminal Sout2. Variations in the curve according to the load current Iout2 may be seen.

However, this device has the drawback of increasing the consumption of the device when the amplifier AO3 is activated, and requires an additional device for detecting the value of the current Iout2, of the value of the potential Vcc and for monitoring the switchable gain R3.

Moreover, when one amplifier is switched to another, a discontinuity in the output voltage of the device is observed. In the case of a window lift motor controlled by a microprocessor, the output voltage Vout2 supplies power to the microprocessor. Variations in its supply voltage may hinder its operation, leading to the window lift operating poorly.

Consequently, there is a need to modify a compensation device known from the prior art such that it withstands high potentials, has low consumption, is simple to implement and exhibits a near-linear output voltage.

SUMMARY

Embodiments of the invention relate to compensation and stabilization devices, in particular compensation devices implementing the Miller effect known to those skilled in the art for compensating for the phase and gain margin of a system, in particular those suitable for high voltages, for example, 28 volts. Such systems are for example incorporated within window lift motors and side rear-view mirror motors of a vehicle.

Some embodiments modify the Miller compensation device known from the prior art such that the Miller capacitance withstands high voltages, i.e., for example, a voltage of the order of 28 volts applied across its terminals.

According to embodiments and modes of implementation, provision is made for controlling the value of the potential at a terminal of the "Miller capacitance" capacitor such that the voltage across the terminals of the capacitor is lower than the voltage that is harmful to it.

According to an embodiments, a Miller compensation and stabilization device for a feedback control loop includes a capacitor having a first terminal that is intended to be coupled to the output of a comparator of the loop and a control circuit that is coupled to a second terminal of the capacitor and is configured to control, in response to a voltage applied to a setpoint input of the loop, the voltage across the terminals of the capacitor by controlling the value of the potential of the second terminal of the capacitor such that the voltage is lower than a threshold.

According to one embodiment, the control circuit comprises a resistor, having a first terminal coupled to a current source and to the second terminal of the capacitor and a second terminal coupled to a voltage source.

Advantageously, the control circuit additionally comprise a PMOS transistor that is linked between the first terminal of the resistor and the second terminal of the capacitor, the gate being linked to the first terminal of the resistor, the source being coupled to a current source and the second terminal of the capacitor, and the drain being linked to a common ground of the device.

The PMOS transistor decreases the impedance of the resistance at the terminal of the capacitor.

The value of the threshold may be, for example, 3.64 volts.

According to another aspect, a voltage feedback control device is proposed, the device comprising the feedback control loop and the compensation and stabilization device.

According to yet another aspect, an integrated circuit comprising the feedback control device is proposed.

According to yet another aspect, a Miller compensation and stabilization method for a feedback control loop is proposed, in which a first terminal of a capacitor is coupled to the output of a comparator of the loop, and the voltage across the terminals of the capacitor is controlled, in response to a voltage applied to a setpoint input of the loop, by controlling the value of the potential of the second terminal of the capacitor such that the voltage is lower than a threshold.

According to one mode of implementation, a current is injected into a resistor, a first terminal of which is coupled to the second terminal of the capacitor and a second terminal of which is coupled to the voltage source.

BRIEF DESCRIPTION OF THE DRAWINGS

Other advantages and features of the invention will become apparent upon examining the detailed description of completely non-limiting embodiments and the appended drawings, in which.

DETAILED DESCRIPTION OF ILLUSTRATIVE EMBODIMENTS

Figure 5:
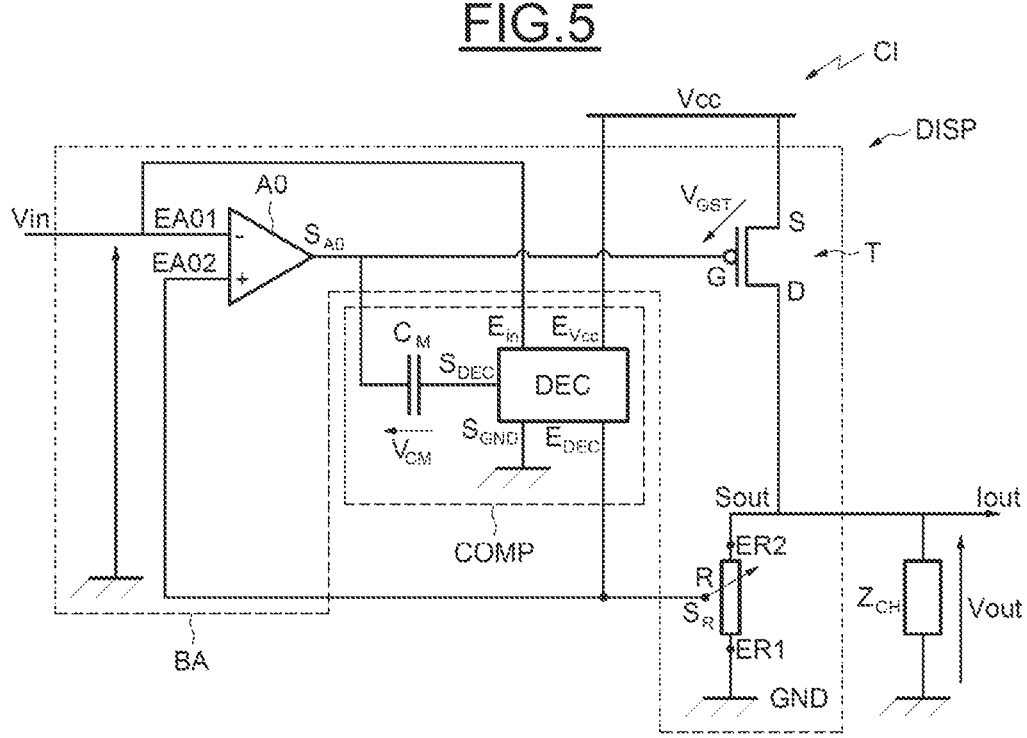
FIGS. 5 to 9 illustrate various embodiments and modes of implementation of the invention.

Reference is made to FIG. 5, which shows an exemplary embodiment of a voltage feedback control device DISP that is suitable for high voltages and supplies power to a load ZCH, which device is incorporated within an integrated circuit CI.

The device DISP comprises a voltage source Vcc, a feedback control loop BA comprising an operational amplifier AO and a Miller compensation and stabilization device COMP comprising a capacitor CM and a control circuit that is suitable for controlling the value of an electrical potential such that the voltage VCM across the terminals of the capacitor CM is lower than a threshold Sv. An input voltage Vin of the device DISP is applied to the negative input EAO1 of the amplifier AO.

The feedback control loop BA includes a comparator incorporating the amplifier AO. The input EAO1 of the amplifier AO forms the setpoint input of the loop BA, the input EAO2 of the amplifier AO forms the negative feedback input of the loop BA and the output SAO of the amplifier AO forms the output of the comparator.

The value of the threshold Sv may be equal to 3.64 volts.

The positive input EAO2 of the amplifier AO is linked to the output SR of a variable gain R (e.g., a variable resistor). The variable gain comprises for example a voltage divider. A first terminal ER1 of the variable gain R is linked to ground GND and a second terminal ER2 of the gain R is linked to a terminal Sout of the device DISP.

The load ZCH is linked in parallel to the gain R both to the terminal Sout and to ground GND.

The load ZCH may be a resistive, inductive or capacitive load.

The output SAO of the amplifier AO is linked to the gate G of a PMOS transistor T. The source S of the transistor T is linked to the potential Vcc and the drain D of the transistor T is linked to the terminal Sout.

The feedback control loop is configured such that the value of the potential at the output SAO of the operational amplifier AO is substantially equal to the value of the potential of the voltage source Vcc.

The value of the voltage Vout at the terminal Sout is equal to the value of the voltage Vin multiplied by the value of the gain R.

Generally, the value of the voltage Vin is imposed.

The gain R is chosen such that the value of the voltage Vout is suitable for supplying power to the load ZCH when a setpoint voltage Vin is applied to the input EAO1 of the amplifier AO.

The amplifier AO operates in linear mode.

The control circuit comprises a device for controlling an electrical potential DEC.

A first terminal of the capacitor CM is linked to the output of a comparator of the feedback control loop BA and the second terminal of the capacitor CM is linked to an output terminal $S_{DEC}$ of the device DEC.

The capacitor CM is known to those skilled in the art as a "Miller capacitance."

The capacitance CM is sized in a manner known to those skilled in the art such that the device DISP is stable within the bandwidth of the amplifier AO.

An input terminal Ein of the device DEC is linked to the terminal EAO1.

The device DEC additionally comprises an input terminal $E_{Vcc}$ linked to the potential Vcc, a terminal EDEC linked to the terminal SR and a terminal $E_{GND}$ linked to ground GND.

The control circuit is coupled between a second terminal of the capacitor CM and the voltage source Vcc.

Figure 6:
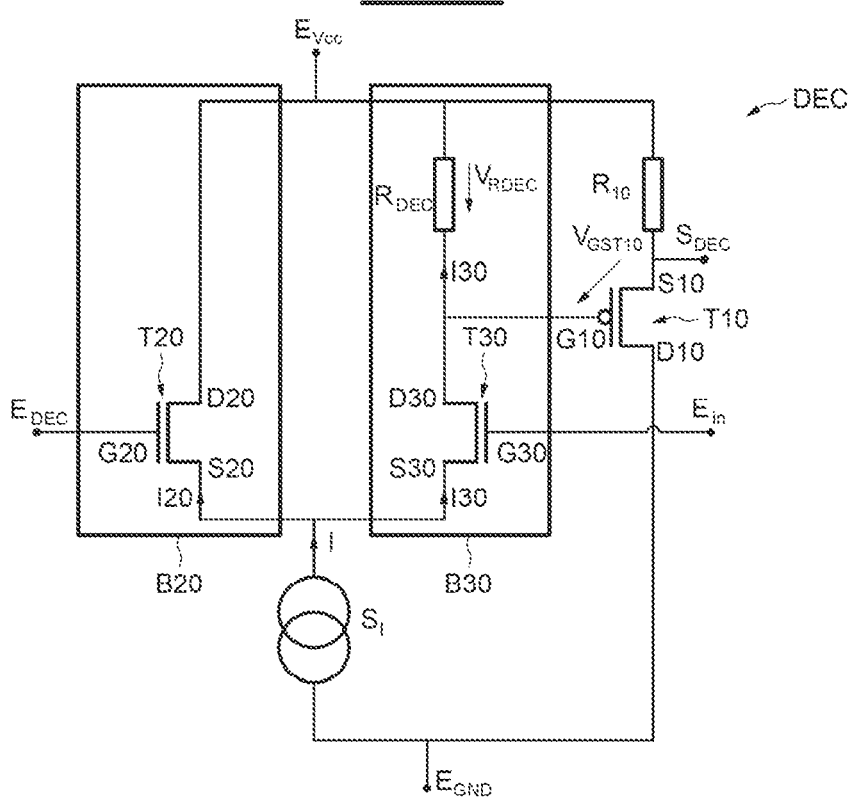

FIG. 6 illustrates one embodiment of the device DEC.

The device DEC comprises a current source SI delivering a current I of constant value.

A first terminal of the current source SI is linked to the terminal $E_{GND}$ and a second terminal is linked to the source S20 and S30 of two NMOS transistors T20 and T30, respectively.

The gate G20 of the transistor T20 is linked to the terminal EDEC, and its drain D20 is linked to the terminal $E_{Vcc}$.

The gate G30 of the transistor T30 is linked to the terminal EIN and its drain D30 is linked both to the gate G10 of a PMOS transistor T10 and to the first terminal of a resistor $R_{DEC}$.

The transistor T20 coupled to the terminal $E_{Vcc}$ and to the current source SI form a first circuit branch B20. The resistor $R_{DEC}$ and the transistor T30 extending between the terminal $E_{Vcc}$ and the current source SI form a second circuit branch B30.

The drain D10 of the transistor T10 is linked to the terminal $E_{GND}$, and the source S10 of the transistor T10 is linked both to the terminal $S_{DEC}$ and to a first terminal of a resistor $R_{10}$.

The source S10 is coupled to a current source incorporating the resistor $R_{10}$, a first terminal of which is linked to the voltage source Vcc.

The second terminal of each of the resistors $R_{DEC}$ and $R_{10}$ is linked to the terminal $E_{Vcc}$.

The control circuit comprises a resistor $R_{DEC}$, a first terminal of which is coupled to a current source SI and to the second terminal of the capacitor CM and a second terminal of which is coupled to the voltage source Vcc.

The transistor T10 operates in the follower mode. The resistor $R_{10}$ biases the transistor T10 such that the impedance at the terminal $S_{DEC}$ is decreased.

Stated otherwise, the control circuit additionally includes a PMOS transistor T10 that is linked between the first terminal of the resistor and the second terminal of the capacitor CM. The gate G10 of the transistor T10 is linked to the first terminal of the resistor $R_{DEC}$, the source S10 is coupled to a current source and the second terminal of the capacitor CM, and the drain D10 is linked to a common ground GND of the device DISP.

In a first mode of implementation of the device DISP, the voltage Vin is a DC voltage of constant value.

In the steady state, i.e., when the device DISP is at equilibrium after the transient phase, the transistors T20 and T30 are on and the voltage across the terminals of the circuit branches B20 and B30 is equal. Consequently, the current I is divided into two currents I20 and I30 of equal value, the current I20 flowing through the branch B20 and the current I30 flowing through the branch B30.

The value of the current I is, for example, equal to 8 µA, and, as such, each of the values of the currents I20 and I30 is equal to 4 µA.

The voltage at the terminal of the gate G10 of the transistor T10 is equal to the potential VCC of the terminal $E_{Vcc}$ minus the voltage $V_{RDEC}$ across the terminals of the resistor $R_{DEC}$.

The gate-source voltage $V_{GST10}$ of the transistor T10 is higher than the threshold voltage of the transistor T10, which is consequently on, and the value of the voltage $V_{GST10}$ is generally equal to 0.7 volts.

The potential at the terminal $S_{DEC}$ is equal to the potential Vcc at the terminal $E_{Vcc}$ minus the voltage $V_{RDEC}$ plus the voltage $V_{GST10}$.

The voltage $V_{RDEC}$ is equal to the value of the current I30 multiplied by the value of the resistor $R_{DEC}$.

Stated otherwise, a current is injected into a resistor $R_{DEC}$, a first terminal of which is coupled to the second terminal of the capacitor CM and a second terminal of which is coupled to the voltage source Vcc.

The device DISP controls the potential at the output SAO such that the potential of the gate G is equal to the value of the potential Vcc minus the value of the gate-source voltage VGST of the transistor T.

For example, the value of the voltage VGST is equal to 0.7 volts and the value of the potential Vcc is equal to 28 volts, the value of the potential at the output SAO is equal to 27.3 volts.

The value of the voltage VGST varies according to the value of the current Iout. The transistor T is sized such that the value of the voltage VGST is lower than the threshold Sv regardless of the value of the current Iout.

Consequently, the voltage VCM across the terminals of the "Miller capacitance" capacitor CM is equal to the voltage $V_{RDEC}$ minus the value of the voltages VGST and $V_{GST10}$.

Stated otherwise, in response to a voltage Vin applied to a setpoint input EAO1 of the feedback control loop BA, the voltage VCM across the terminals of the capacitor CM is controlled by controlling the value of the potential of the second terminal of the capacitor such that the voltage VCM is lower than a threshold Sv.

The control circuit is configured to control, in response to a voltage Vin applied to a setpoint input EAO1 of the feedback control loop BA, the voltage VCM across the terminals of the capacitor CM by controlling the value of the potential of the second terminal of the capacitor such that the voltage is lower than a threshold.

The value of the resistor $R_{DEC}$ is, for example, 400 kohms. The value of the voltage VGST is, for example, equal to 0.7 volts. The current I30 is equal to, for example, 4 µA. The voltage VCM is equal to, for example, 0.2 volts lower than the threshold Sv.

It can be seen that the voltage VCM is independent of the potential VCC. Stated otherwise, the voltage VCM is independent, for example, of the positive terminal of the battery.

In a second mode of implementation of the device DISP, the voltage Vin is a voltage of variable frequency.

Figure 7:
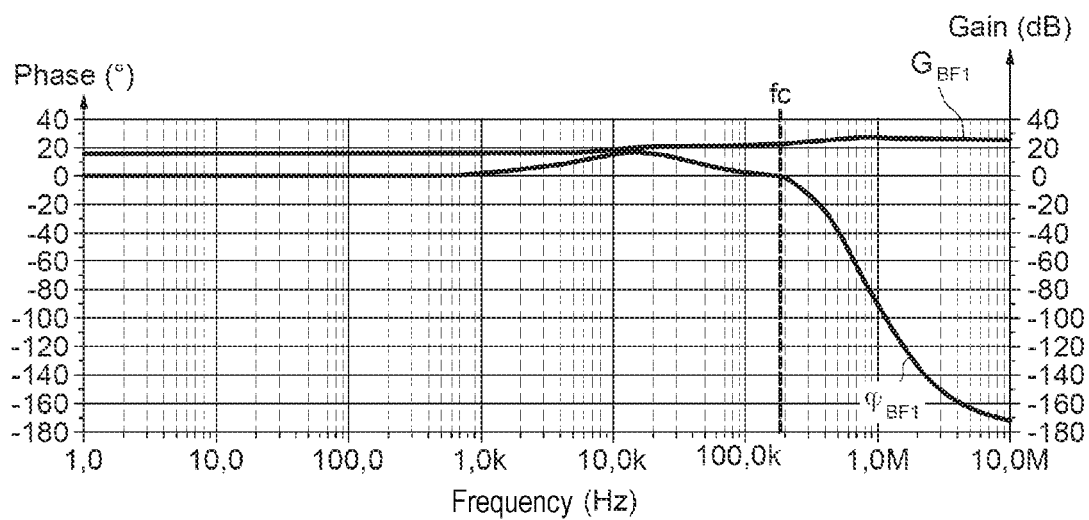

FIG. 7 illustrates an example of gain $G_{BF1}$ and of phase $\varphi_{BF1}$ in a closed loop between the terminal Sout and the terminal $S_{DEC}$ of the device DEC. It can be seen that in the bandwidth extending from 0 to fc kilohertz, the gain is substantially equal to 16 dB and the phase is substantially equal to 0°. The polarity of the potential at the terminal $S_{DEC}$ is identical to the polarity of the potential Vout at the terminal Sout.

The potential at the terminal $S_{DEC}$ behaves like the potential at the terminal Sout to within one gain, hence the Miller effect is in operation.

Figure 8:
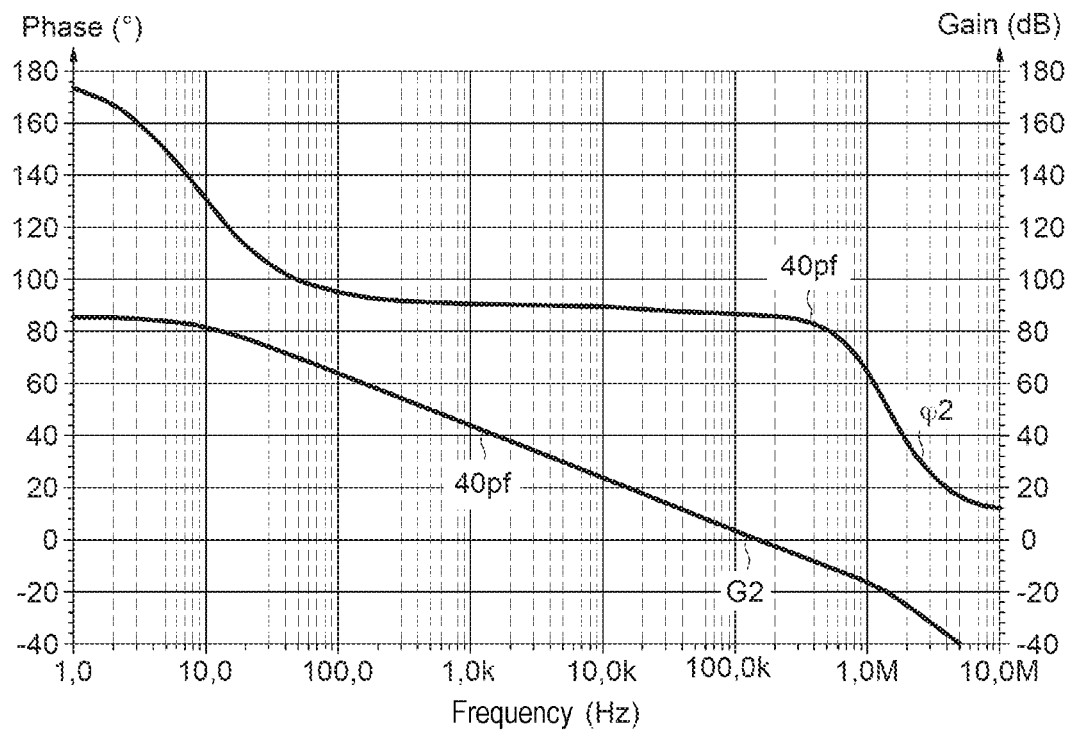

FIG. 8 shows an example of gain G2 and phase φ2 curves in an open loop according to the frequency F for a capacitor CM of 40 pF of the device DISP.

It can be seen that the examples of Bode plots of the Miller compensation device for a Miller capacitance of 200 pF according to the prior art DISP1 and of the Miller compensation device DISP for a Miller capacitance of 40 pF are identical.

Consequently, the capacitance of the "Miller capacitance" capacitor CM is decreased with respect to a Miller capacitance according to the prior art. Advantageously, the gain of the device DEC makes it possible to decrease the size of the capacitor CM.

Figure 1:
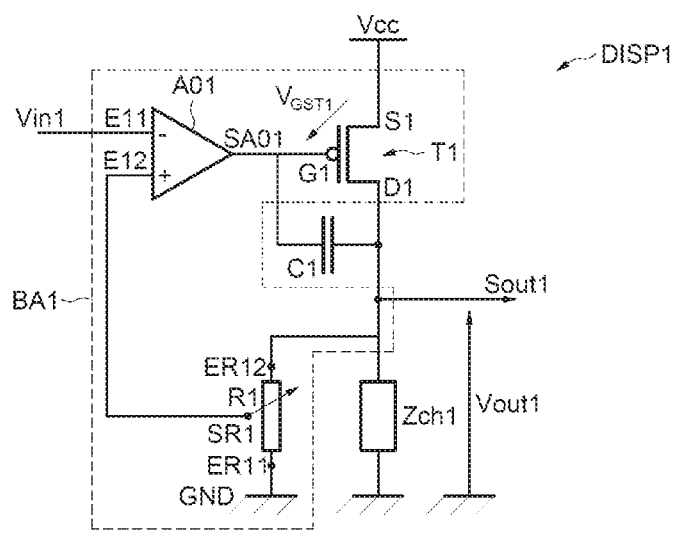
FIGS. 1 to 4, described above, illustrate compensation devices known from the prior art.
Figure 2:
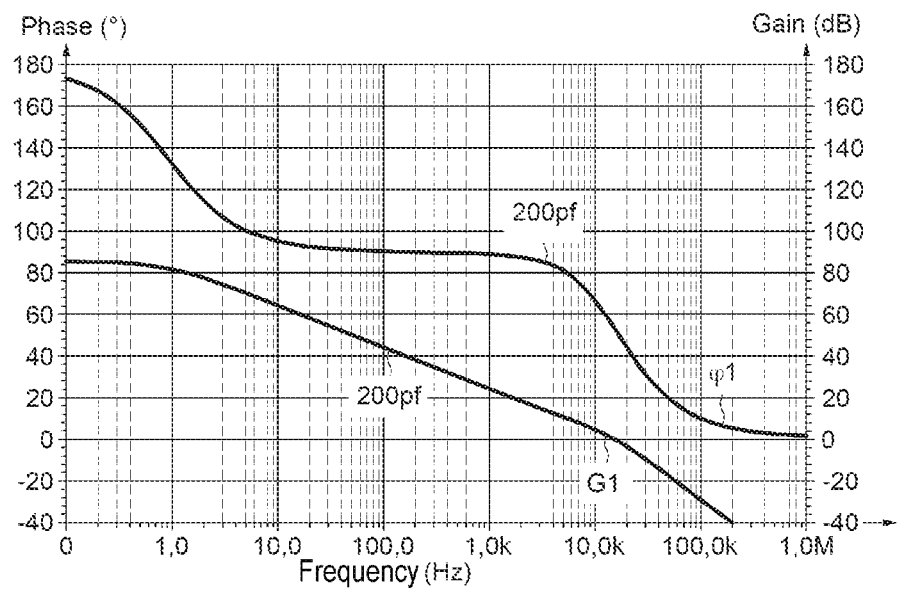
Figure 3:
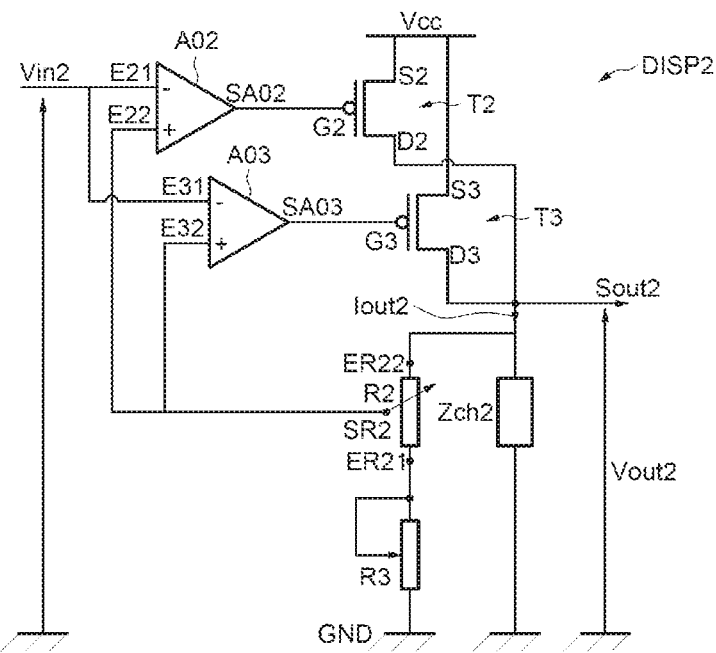
Figure 4:
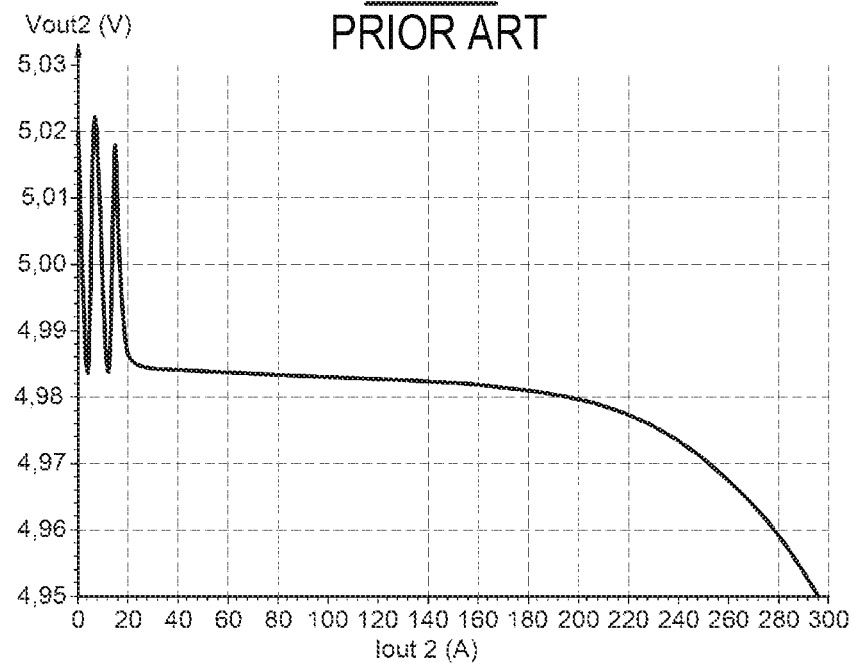
Figure 9:
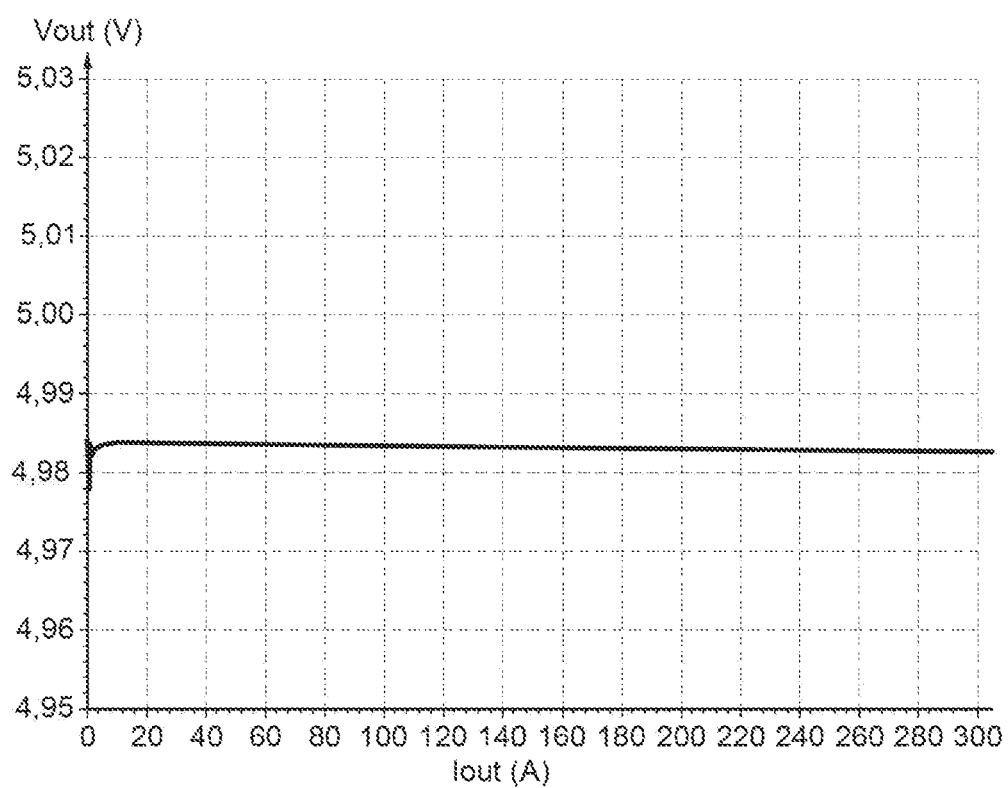

FIG. 9 shows an example of output voltage Vout of the device DISP according to the current Iout at the output terminal Sout. It can be seen that the curve exhibits a very small degree of variation, unlike a device DISP2 of the prior art shown in FIG. 4, which exhibits substantial discontinuities.

Advantageously, the device DISP withstands high voltages and its power consumption is decreased with respect to the devices known from the prior art that withstand high voltages DISP2. Moreover, the output voltage of the device DISP exhibits very small variations with respect to that of the devices known from the prior art that withstand high voltages DISP2.

What is claimed is:

1. A Miller compensation and stabilization device for a feedback control loop, the device comprising:
   a first supply terminal and a second supply terminal;
   a capacitor having a first terminal configured to be coupled to an output of a comparator of the feedback control loop, the capacitor also having a second terminal;
   a control circuit separate from the comparator and coupled to the second terminal of the capacitor, the control circuit configured to control, in response to a voltage applied to a setpoint input of the feedback control loop, a first voltage across the first and second terminals of the capacitor by controlling a value of a potential of the second terminal of the capacitor such that the first voltage is lower than a threshold, wherein the control circuit comprises a resistor having a first terminal coupled to the first supply terminal, and a PMOS transistor having a gate coupled to a second terminal of the resistor and a drain coupled to the second supply terminal.

2. The device of claim 1, wherein the control circuit further comprises a second resistor having a first terminal coupled to the second terminal of the capacitor and a second terminal coupled to the first supply terminal.

3. The device of claim 2, wherein a source of the PMOS transistor is coupled between the first terminal of the second resistor and the second terminal of the capacitor.

4. The device of claim 3, wherein the control circuit further comprises:
   a second transistor having a current path coupled to the first supply terminal and a gate configured to be coupled to a second input of the comparator;
   a third transistor having a current path coupled to the first supply terminal and a gate configured to be coupled to the setpoint input; and
   a current source coupled to the current path of the second transistor and the current path of the third transistor.

5. The device of claim 4, wherein the second transistor is an NMOS transistor and the third transistor is an NMOS transistor.

6. The device of claim 4, wherein the second transistor is configured to carry a first current, and the third transistor is configured to carry a second current equal to the first current.

7. The device of claim 1, further comprising a comparator.

8. The device of claim 7, wherein the setpoint input is coupled to a negative input of the comparator.

9. The device of claim 1, wherein a value of the threshold is about 3.64 volts.

10. A system comprising:
    an amplifier having a first input, a second input, and an output;
    a first transistor having a current path coupled between a first supply terminal and an output terminal, and a gate coupled to the output of the amplifier;
    a variable resistor having an output coupled to the second input of the amplifier;
    a capacitor having a first terminal coupled to the output of the amplifier;
    a control circuit separate from the amplifier and the first transistor, the control circuit coupled to a second terminal of the capacitor, the control circuit configured to control, in response to a voltage applied to the first input of the amplifier, a first voltage across the first and second terminals of the capacitor by controlling a value of a potential of the second terminal of the capacitor such that the first voltage is lower than a threshold, wherein the control circuit comprises an output terminal coupled to the second terminal of the capacitor, and a second transistor having a current path coupled to the output terminal of the control circuit and a gate coupled to a current source.

11. The system of claim 10, wherein the amplifier, the capacitor and the control circuit are integrated in an integrated circuit.

12. The system of claim 10, further comprising a load coupled to the output terminal.

13. The system of claim 10, wherein the control circuit further comprises a first input coupled to the first input of the amplifier and a second input coupled to the second input of the amplifier.

14. The system of claim 13, wherein the second transistor is a PMOS transistor, and wherein the control circuit further comprises a second resistor coupled between the output of the control circuit and the first supply terminal.

15. The system of claim 10, wherein the first voltage is independent from a voltage of the first supply terminal.

16. The system of claim 10, further comprising a comparator having a negative input coupled to the first input of the amplifier.

17. A method for Miller compensation and stabilization of a feedback control loop, the method comprising:
    receiving a first supply voltage at a first supply terminal;
    receiving a first input voltage at an input of an amplifier of the feedback control loop, the amplifier having an output coupled to a control terminal of a transistor, the transistor receiving the first supply voltage; and
    controlling, with a circuit separate from the amplifier and in response to the first input voltage, a first voltage across a capacitor having a first terminal coupled to the output of the amplifier by controlling a value of a potential of a second terminal of the capacitor such that the first voltage is lower than a threshold, wherein the circuit separate from the amplifier comprises a resistor having a first terminal coupled to the first supply terminal, and a PMOS transistor having a gate coupled to a second terminal of the resistor and a drain coupled to a second supply terminal.

18. The method of claim 17, further comprising injecting a current into a second resistor having a first terminal coupled to the second terminal of the capacitor and a second terminal coupled to the first supply terminal.

19. The method of claim 17, wherein the threshold is about is about 3.64 volts.

20. The method of claim 17, further comprising decreasing an impedance at the second terminal of the capacitor with a PMOS transistor.

21. The method of claim 17, wherein the first supply voltage is lower or equal to 28 volts.

22. The method of claim 17, wherein the first voltage is independent from the first supply voltage.

23. The method of claim 17, wherein a second terminal of the resistor is coupled to the second terminal of the capacitor, a source of the PMOS transistor coupled between the first terminal of the resistor and the second terminal of the capacitor.

* * * * *